(12) United States Patent
Owen

(10) Patent No.: US 7,417,533 B2
(45) Date of Patent: Aug. 26, 2008

(54) VEHICLE SIGNALING SYSTEM

(76) Inventor: Kenneth R. Owen, 6918 Kitson Dr., Rockford, MI (US) 49341

( * ) Notice: Subject to any disclaimer, the term of this patent is extended or adjusted under 35 U.S.C. 154(b) by 233 days.

(21) Appl. No.: 11/280,158

(22) Filed: Nov. 16, 2005

(65) Prior Publication Data

US 2007/0109113 A1      May 17, 2007

(51) Int. Cl.
*B60Q 1/26* (2006.01)

(52) U.S. Cl. .......... 340/468; 340/465; 340/471; 340/475; 340/477; 340/478

(58) Field of Classification Search ............ 340/468, 340/463, 465, 467, 471, 475, 479, 476, 477, 340/472, 464

See application file for complete search history.

(56) References Cited

U.S. PATENT DOCUMENTS

| | | | | |
|---|---|---|---|---|
| 5,260,685 A | * | 11/1993 | Parker | 340/477 |
| 5,426,414 A | * | 6/1995 | Flatin et al. | 340/472 |
| 5,486,808 A | * | 1/1996 | Nejdl | 340/464 |
| 5,502,432 A | | 3/1996 | Ohmamyuda et al. | 340/436 |
| 5,528,218 A | * | 6/1996 | Rigsby | 340/475 |
| 5,901,806 A | | 5/1999 | Takahashi | 180/170 |
| 6,020,813 A | * | 2/2000 | Harris et al. | 340/465 |
| 6,114,951 A | | 9/2000 | Kinoshita et al. | 340/436 |
| 6,121,896 A | | 9/2000 | Rahman | 340/902 |
| 6,154,126 A | | 11/2000 | Beasley et al. | 340/468 |
| 6,240,346 B1 | | 5/2001 | Pignato | 701/35 |
| 6,333,687 B1 | * | 12/2001 | LaBelle | 340/466 |
| 6,515,583 B1 | * | 2/2003 | Lamparter et al. | 340/433 |
| 6,753,769 B1 | * | 6/2004 | Elliott | 340/464 |
| 6,952,162 B2 | * | 10/2005 | Monck et al. | 340/464 |

* cited by examiner

*Primary Examiner*—Toan Pham
(74) *Attorney, Agent, or Firm*—Price, Heneveld, Cooper, DeWitt & Litton, LLP

(57) ABSTRACT

A motor vehicle includes a conventional tail light arrangement, and also includes an indicator light that can be actuated by a vehicle operator. The indicator light is configured to provide a signal to a driver of another vehicle that the other driver is "tailgating" or otherwise following the lead vehicle too closely. The indicator light arrangement may include a timer that turns the indicator light off a preselected time, such that the light is not turned on again unless the vehicle operator again actuates the switch.

10 Claims, 2 Drawing Sheets

_US 7,417,533 B2_

VEHICLE SIGNALING SYSTEM

BACKGROUND OF THE INVENTION

A common problem encountered by individuals driving a vehicle on a roadway involves other drivers who follow the vehicle very closely. Such driving behavior is often referred to as "tailgating". The short distance between vehicles due to tailgating often does not provide sufficient time for the driver of the rear vehicle to react in the event of an emergency or the like. Also, tailgating can be quite annoying to the driver in the lead vehicle.

Accordingly, a method of reducing or alleviating such driving behavior would be beneficial.

SUMMARY OF THE INVENTION

One aspect of the present invention is a motor vehicle of the type having left and right spaced-apart tail lights to signal when an operator is braking, turning, or backing up. The tail lights of such a vehicle typically include running lights used for night-time operation of the vehicle. The present invention provides an improvement including an indicator light system including an indicator light that may be mounted to a rear portion of the vehicle where it is readily visible to a driver in back of the vehicle. An example of such a location is between the left and right tail lights. The indicator light has a visual appearance when lit that is readily distinguishable from the visual appearance of the left and right tail lights. A movable switch having an ON position and an OFF position is positioned in an interior of the vehicle where it is readily accessible to an operator of the vehicle. The switch may be biased into the ON position, and the switch is coupled to the indicator light and initially turns on the indicator when the switch is in the ON position. The indicator light system further includes a timer that is operably coupled to the indicator light to turn off the indicator light after a predetermined time interval has passed from when the indicator light was turned on. The system may be configured such that the indicator light does not turn on again unless the switch is again moved to the ON position.

These and other aspects, features and advantages of the present invention will be further understood and appreciated by those skilled in the art by reference to the following specification, claims, and appended drawings.

BRIEF DESCRIPTION OF THE DRAWINGS

FIG. 1.

DETAILED DESCRIPTION OF PREFERRED EMBODIMENT

Figure 1:
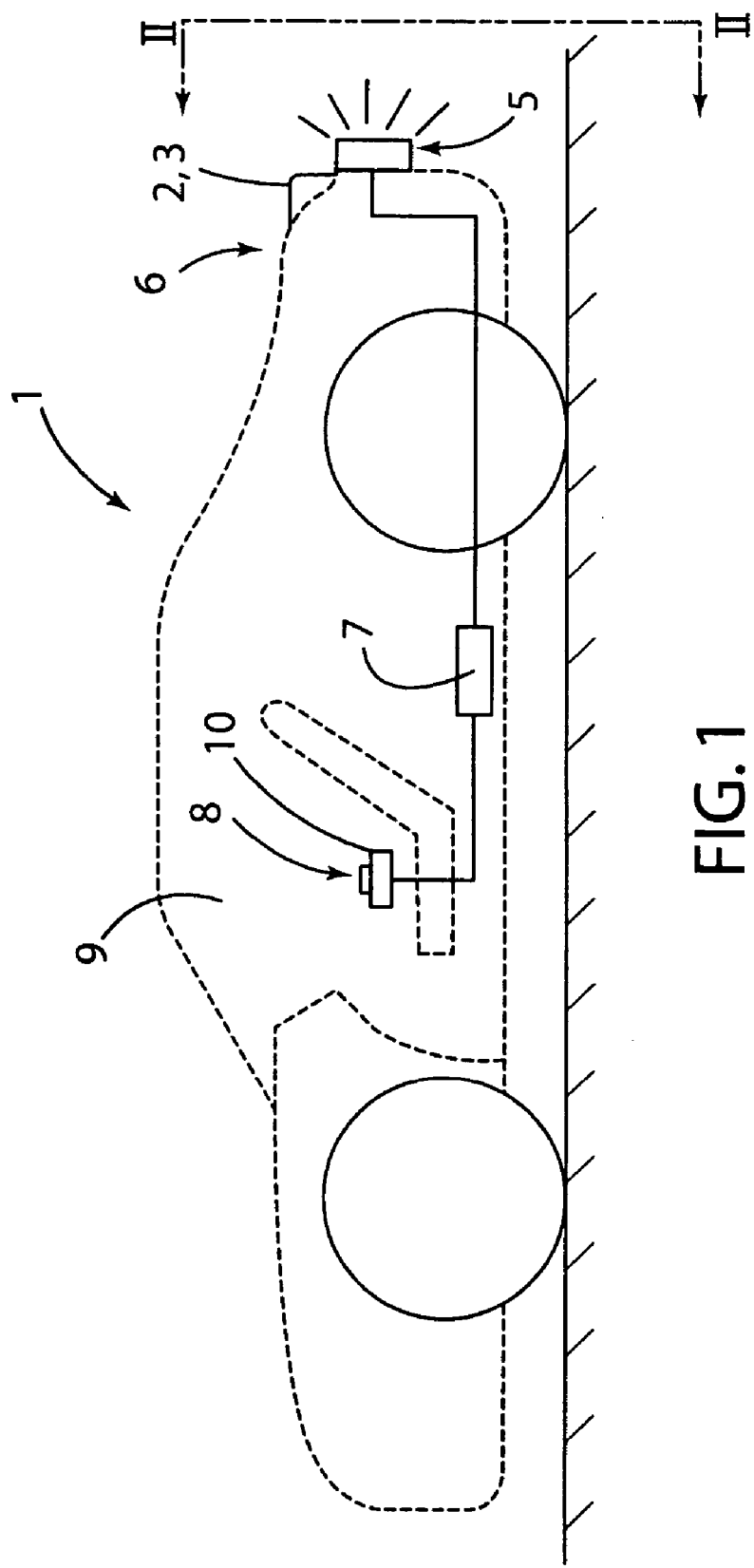
FIG. 1 is a partially schematic side elevational view of a vehicle including an indicator light, switch, and timing circuit according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
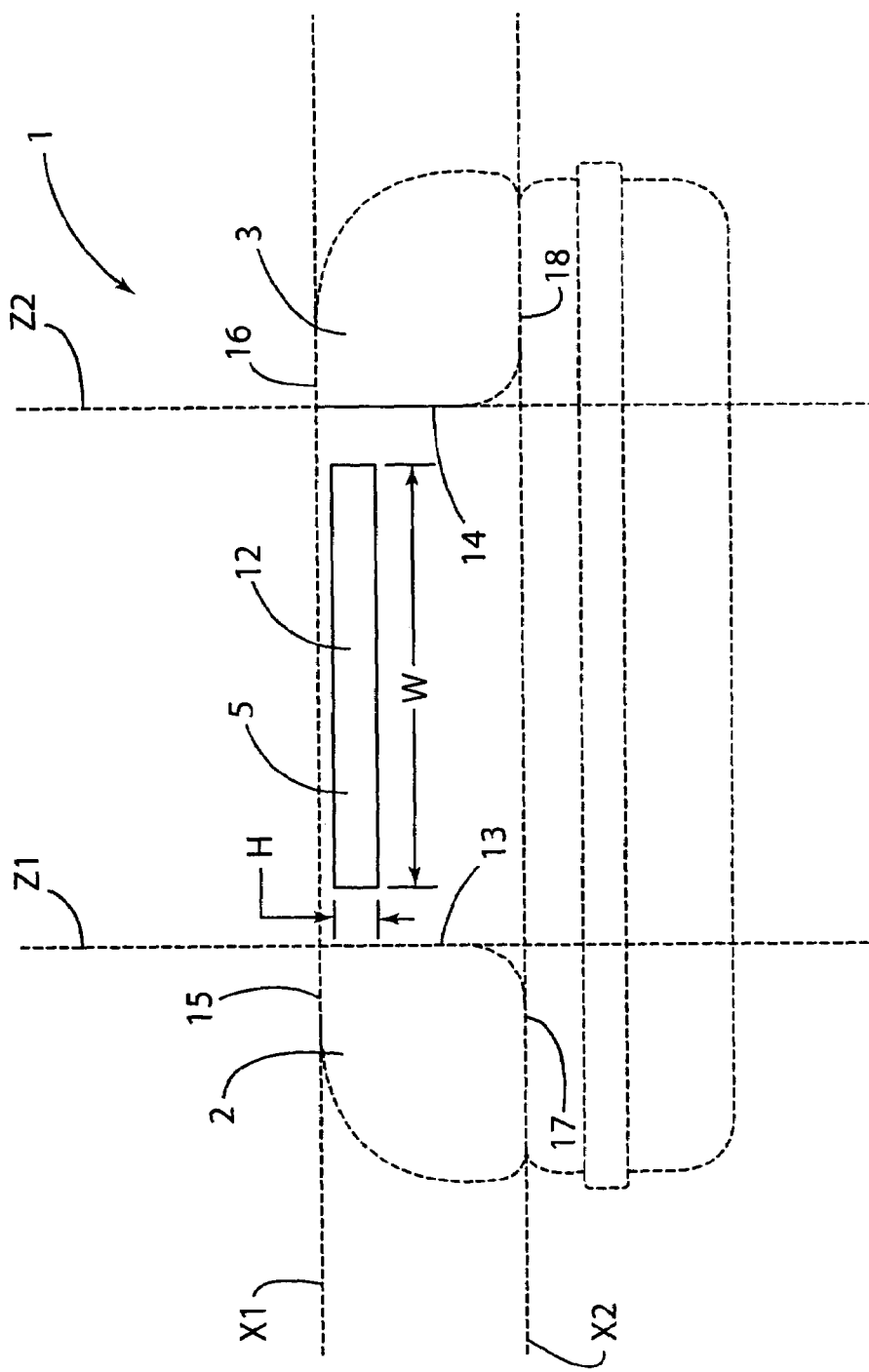
FIG. 2 is a partially schematic view of the rear portion of the vehicle of FIG. 1 taken along the line II-II.

With reference to FIGS. 1 and 2, a vehicle 1 includes an electrical power system including a battery, alternator, wiring, and related electrical components (not shown) that provide electrical power to a left tail light 2 and a right tail light 3. Although the specific design of the tail lights 2 and 3 may vary substantially, it will be understood that left and right tail lights 2 and 3 normally conform to the applicable government safety regulation, such as Federal Motor Vehicle Safety Standard No. 108, found in the Code of Federal Regulations, Title 49 Part 571, 1995 Edition. In general, the tail lights 2 and 3 will include red running lights for night-time use, and red brake lights having a higher light intensity to indicate when the driver is braking. When used as parking lights, the tail lights 2 and 3 may provide a white or amber light. Also, a green light indicating when the accelerator is depressed may optionally be included. Tail lights normally include turn signals that flash intermittently when activated. Turn signals are normally red, amber, or yellow in color. These and other conventional tail light configurations and features are well known, such that these features will not be described in further detail herein.

An indicator light 5 according to one aspect of the present invention is mounted to a rear portion 6 of the vehicle 1. The indicator light 5 is coupled to a timer 7 and a switch 8 that is positioned in the vehicle interior 9 where it can be readily accessed by a vehicle operator. In use, if a vehicle is tailgating or otherwise traveling too close to the rear portion 6 of vehicle 1, the operator activates the switch 8 to turn on the indicator light 5 to thereby provide a signal to the driver of the vehicle in back of vehicle 1 that the vehicle is too close. The light 5 stays on for a predetermined period of time, and then automatically shuts off due to timer 7. The time interval may be quite short, such as 1 second, or it may be chosen to be longer, such as 5 or 10 seconds or longer. The switch 8 may include a movable switch member 10 having an ON position and an OFF position. The movable switch member 10 may be biased to the OFF position, such that a vehicle operator pushes the movable switch member 10 once to turn on the indicator light 5. The indicator light 5 stays on until it is turned off by timer 7. It will be understood that the switch 8 may have a wide variety of configurations such as a push button, rocker switch, touch screen, or other suitable configuration. The switch may be configured such that it does not include a movable member biased into an OFF position. In the illustrated example, the timer 7 turns the light 5 off, and the light 5 is not turned on again until the switch 8 is actuated by the vehicle operator (or other person riding in the vehicle 1). The timer may comprise an electrical circuit/device or programmable controller.

In an illustrated example (FIG. 2), indicator light 5 includes an elongated lens 12 having a height "H" that is substantially smaller than the width "W" thereof. The indicator light 5 and lens 12 extend between the left and right turn signals 2 and 3. In the illustrated example, the indicator light 5 positioned horizontally between vertical lines Z1 and Z2, wherein the lines Z1 and Z2 correspond to the inner edges 13 and 14 of left and right tail lights 2, 3, respectively. In the illustrated example, the indicator light 5 and lens 12 are vertically positioned between horizontal lines X1 and X2 corresponding to the upper edges 15 and 16 and lower edges 17 and 18, respectively, of tail lights 2 and 3. Indicator light 5 is preferably positioned so it is readily visible to an operator of a vehicle following the vehicle 1. Indicator light 5 preferably has a color and/or shape and/or blinking pattern/timing configuration that is visually distinguishable from the colors and configurations of the tail lights 2 and 3. For example, indicator light 5 and/or lens 12 may have a color that is substantially different than any of the colors of the tail lights 2 and 3. For example, it is anticipated that the indicator light 5 may have a distinctive color such as blue to readily distinguish the indicator light 5 from other tail light signals and the like. It will be understood that the indicator light 5 is preferably chosen to conform to current federal and state motor vehicle requirements. Alternately, indicator light 5 may have a color and/or configuration that does not conform to current requirements, but rather conforms to future requirements implemented for the purpose of accommodating and/or requiring indicator light 5. Also, it will be understood that the term "off", as used herein, is not limited to a condition wherein the lights emit no light whatsoever, and may include various degrees of brightness that are less than the "on" configuration.

In another aspect of the present invention, the indicator light may comprise the turn signal lights of tail lights 2 and 3. The turn signal lights may be turned on and off in a sequence and/or timing other than the standard blinking signal indicating the driver is turning. For example, the left and right turn signals may turn on and off in an alternating left/right sequence. In this configuration, the timer 7 and/or other component provide for alternating left/right flashing of the turn signal lights for a preselected period of time.

The indicator light 5 may include one or more incandescent bulbs and colored lenses 12 or the like to provide an appropriate color. Alternately, the indicator light 5 may include one or more LED light sources having a specific color or colors. Also, the indicator light 5 may include one or more LED light sources producing a light that is transmitted through a colored lens or lenses to further modify the color of the indicator light as viewed by individuals outside of vehicle 1.

The indicator light 5 and related components of the present invention provide a very simple and cost-effective way for a vehicle operator to signal another driver that the other driver is following too closely. The indicator light system thereby provides a way to alleviate potential risks associated with tailgating, aggressive driving behavior, and the like.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A motor vehicle signaling system, comprising:
   first and second spaced-apart lights configured to be mounted to a vehicle;
   a manually actuatable switch having an ON state and an OFF state;
   an electrical device operably coupled to the lights and the switch, wherein the electrical device turns the first and second lights on and off in an alternating left and right blinking manner upon a single change of state of the manually actuatable switch from the OFF state to the ON state, and wherein:
   the electrical device turns off both the first and second lights after a single preselected period of time from the single change of state of the manually actuatable switch.

2. The motor vehicle signaling system of claim 1 including:
   a turn signal switch in addition to the manually actuatable switch, the turn signal switch having an off position, a left turn position, and a right turn position, and wherein:
   the first and second lights comprise turn signal lights configured to blink to indicate a turning direction upon actuation of the turn signal switch to the left turn position and the right turn position.

3. The motor vehicle signaling system of claim 2, wherein:
   the manually actuatable switch is actuated without braking of a vehicle and without placing a transmission of a vehicle in reverse.

4. The motor vehicle signaling system of claim 1, wherein:
   the first and second lights do not emit any light when turned off.

5. In a motor vehicle signaling system of the type having a first group of rear vehicle lights, the first group including at least turn signal lights, brake lights and back up lights, and a first group of switches controlling the first group of rear vehicle lights, including a turn signal switch controlling the turn signal lights, and wherein the first group of lights define a plurality of distinct visual appearances when selected ones of the lights are turned on by selected ones of the first group of switches, the improvement;
   an indicator light having a visual appearance when lit that is substantially different than the distinct visual appearances of the first group of lights;
   a manually operable switch that is not included in the first group of switches and located remote from the first group of lights and the indicator light;
   a timer coupled to the manually operable switch and the indicator light, and wherein:
   the indicator light is initially lit when the manually operable switch is actuated, and the timer turns the indicator light off after a preselected time interval.

6. The motor vehicle signaling system of claim 5, wherein:
   the first group of lights have a first group of colors;
   the indicator light has a color that is not one of the first group of colors.

7. The motor vehicle signaling system of claim 5, wherein:
   the manually operable switch is movable between first and second positions, and the switch turns the indicator light on when in the second position.

8. The motor vehicle signaling system of claim 7, wherein:
   the manually operable switch is biased to the first position.

9. The motor vehicle signaling system of claim 8, wherein:
   the manually operable switch comprises a first switch that is not operable to control any of the first group of rear vehicle lights; and including:
   a turn signal switch movable between an off position, a right turn position, and a left turn position, and wherein the turn signal switch cannot control the indicator light.

10. The motor vehicle signaling system of claim 5, wherein:
    the turn signal lights include spaced-apart left and right turn signal lights; and
    the indicator light is positioned horizontally between the left and right turn signal lights.

* * * * *